US008527167B2

(12) United States Patent
Yamanaka et al.

(10) Patent No.: US 8,527,167 B2
(45) Date of Patent: Sep. 3, 2013

(54) CONTROL APPARATUS OF DRIVING FORCE IN CASE OF BELT SLIPPING FOR VEHICLE EQUIPPED WITH V-BELT CONTINUOUSLY VARIABLE TRANSMISSION AND CONTROL METHOD THEREOF

(75) Inventors: Tsuyoshi Yamanaka, Yamato (JP); Manabu Yamanaka, Machida (JP); Shigeki Shimanaka, Hadano (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 407 days.

(21) Appl. No.: 12/795,244

(22) Filed: Jun. 7, 2010

(65) Prior Publication Data

US 2010/0318270 A1    Dec. 16, 2010

(30) Foreign Application Priority Data

Jun. 10, 2009    (JP) ................................. 2009-138913

(51) Int. Cl.
*G06F 17/00*    (2006.01)

(52) U.S. Cl.
USPC ................................. 701/58; 701/51; 701/60

(58) Field of Classification Search
USPC ......................................... 701/58, 51, 54, 60
See application file for complete search history.

(56) References Cited

U.S. PATENT DOCUMENTS

| 5,310,384 | A  | * | 5/1994 | Siemon ............................ 474/70 |
| 6,436,004 | B1 | * | 8/2002 | Loffler et al. .................... 477/45 |
| 7,211,026 | B2 |   | 5/2007 | Berger et al. |
| 8,157,681 | B2 |   | 4/2012 | Iwasa et al. |

FOREIGN PATENT DOCUMENTS

| CN | 1678849 A | 10/2005 |
| CN | 101187419 A | 5/2008 |
| EP | 1 209 020 A1 | 5/2002 |
| EP | 1 468 862 A2 | 10/2004 |
| JP | 62-273189 A | 11/1987 |
| JP | 2006-511765 A | 4/2006 |
| WO | WO 2004/057216 A1 | 7/2004 |

\* cited by examiner

*Primary Examiner* — James Trammell
*Assistant Examiner* — Jerrah Edwards
(74) *Attorney, Agent, or Firm* — Foley & Lardner LLP

(57) ABSTRACT

A control apparatus of a driving force in case of belt slipping includes a belt slip control detecting unit adapted to detect that the belt slip control is in execution, a belt contact radius ratio calculating unit adapted to calculate a belt contact radius ratio of the V-belt to the pulleys, and a power source output torque determining unit adapted to determine a target power output torque according to the belt contact radius ratio in execution of the belt slip control in response to signals from the belt slip control detecting unit and the belt contact radius ratio calculating unit.

7 Claims, 13 Drawing Sheets

CONTROL APPARATUS OF DRIVING FORCE IN CASE OF BELT SLIPPING FOR VEHICLE EQUIPPED WITH V-BELT CONTINUOUSLY VARIABLE TRANSMISSION AND CONTROL METHOD THEREOF

TECHNICAL FIELD OF THE INVENTION

The present invention relates to a control apparatus of a driving force in case of belt slipping for a vehicle equipped with a V-belt continuously variable transmission.

BACKGROUND OF THE INVENTION

A V-belt continuously variable transmission is configured such that a V-belt is wrapped around a primary pulley on an input side and a secondary pulley on an output side so that transmission of rotation from a power source such as an engine and a motor can be performed.

In order to make shift possible, such a configuration is adopted that the primary pulley and the secondary pulley are respectively configured such that each movable sheave which is one of sheaves forming pulley V-shaped grooves can be stroked in axial directions toward the corresponding other fixed sheave.

In performing shift, stroke control is performed to the movable sheave of one pulley of these pulleys in an axial direction of coming close to or going away from a corresponding fixed sheave, while stroke control is performed to the movable sheave of the other pulley in the axial direction of going away from or of coming close to a corresponding fixed sheave, so that a pulley rotation ratio between both the pulleys is continuously changed toward a value corresponding to a target speed ratio, thereby shift is made.

In the control of shift, as described in JP62-273189A, a pulley rotation ratio corresponding to a torque amplifying ratio of the transmission required in a vehicle driving state (vehicle speed information or a power source load state) is defined as the target speed ratio (a target input rotation speed) from the vehicle driving state, so that continuous shift is performed such that the pulley rotation ratio coincides with the value corresponding to the target speed ratio (the target input rotation speed).

On the other hand, as the V-belt continuously variable transmission, there is conventionally a V-belt continuously variable transmission with a belt slip control apparatus which controls a belt slip ratio actively such that a slip ratio of the V-belt to one of the primary pulley and the secondary pulley reaches a proper value, as described in JP2006-511765A.

SUMMARY OF THE INVENTION

In the V-belt continuously variable transmission equipped with the belt slip control apparatus, when shift control is performed such that the pulley rotation ratio reaches the value corresponding to the target speed ratio (the target input rotation speed), as described above, such a problem as described below occurs.

That is, such shift control is established assuming that a relationship between the pulley rotation ratio and the torque amplifying ratio is fixed and the pulley rotation ratio can be regarded as a physical amount equivalent to the torque amplifying ratio.

However, when the belt slip ratio is actively controlled such that the slip ratio of the V-belt to the pulley reaches the proper value, the pulley rotation ratio is set to the value corresponding to the target speed ratio by the shift control but the relationship between the pulley rotation ratio and the torque amplifying ratio varies (is offset) by an amount corresponding to belt slip.

In this case, even if shift control is performed such that the pulley rotation ratio reaches the value corresponding to the target speed ratio under the same transmission input torque, a transmission output torque (a driving force of the vehicle) varies by an amount corresponding to variation (offset) of the relationship between the pulley rotation ratio and the torque amplifying ratio, which results in such a problem that the driving force is changed due to control of belt slip.

When belt slip of the V-belt occurs, the rotation speed of the primary pulley, namely, an engine rotation speed rises, and such a rise in engine rotation speed regardless of the driver's intension gives the driver an uncomfortable feeling.

In order to suppress occurrence of such an uncomfortable feeling, a belt contact radius ratio of the V-belt is made smaller during the slip control of the V-belt than a case where the slip control is not performed, so that an actual speed ratio is shifted to High.

Thereby, since the torque amplifying ratio of the transmission becomes small, the transmission output torque (the driving force of the vehicle) lowers.

Such lowering of the transmission output torque (the driving force of the vehicle) during the belt slip control not only accompanies deterioration of a vehicle running performance but also causes a problem about driving feeling such as giving the driver an uncomfortable feeling.

An object of the present invention is to avoid driving force changing (lowering) during the above-mentioned belt slip control to reduce deterioration of a vehicle running performance or an uncomfortable feeling due to the driving force changing (lowering) in control of a driving force in case of belt slipping for a vehicle equipped with a V-belt continuously variable transmission.

According to an aspect of the invention, a control apparatus of a driving force in case of belt slipping for a vehicle equipped with a V-belt continuously variable transmission where rotation from a power source can be transmitted via a V-belt wrapped around pulleys, a pulley rotation ratio between the pulleys can be continuously changed toward a value corresponding to a target speed ratio by stroking movable sheaves defining pulley V grooves for wrapping the V-belt relative to fixed sheaves in an axial direction, and a slip state of the V-belt to the pulleys is controlled to a predetermined slip state by a belt slip control, is provided. The control apparatus includes a belt slip control detecting unit adapted to detect that the belt slip control is in execution, a belt contact radius ratio calculating unit adapted to calculate a belt contact radius ratio of the V-belt to the pulleys, and a power source output torque determining unit adapted to determine a target power source output torque according to the belt contact radius ratio in execution of the belt slip control in response to signals from the belt slip control detecting unit and the belt contact radius ratio calculating unit.

According to another aspect of the invention, a control method of a driving force in case of belt slipping for a vehicle equipped with a V-belt continuously variable transmission where rotation from a power source can be transmitted via a V-belt wrapped around pulleys, a pulley rotation ratio between the pulleys can be continuously changed toward a value corresponding to a target speed ratio by stroking movable sheaves defining pulley V grooves for wrapping the V-belt relative to fixed sheaves in an axial direction, and a slip state of the V-belt to the pulleys is controlled to a predetermined slip state by a belt slip control, is provided. The method includes detecting that the belt slip control is in execution, calculating a belt contact radius ratio of the V-belt to the pulleys, and determining a target power source output torque according to the belt contact radius ratio in execution of the belt slip control in response to results of the detecting operation and the calculating operation.

DESCRIPTION OF THE PREFERRED EMBODIMENTS

Embodiments of the present invention will be explained below with reference to the drawings.

<Configuration of First Embodiment>

Figure 1:
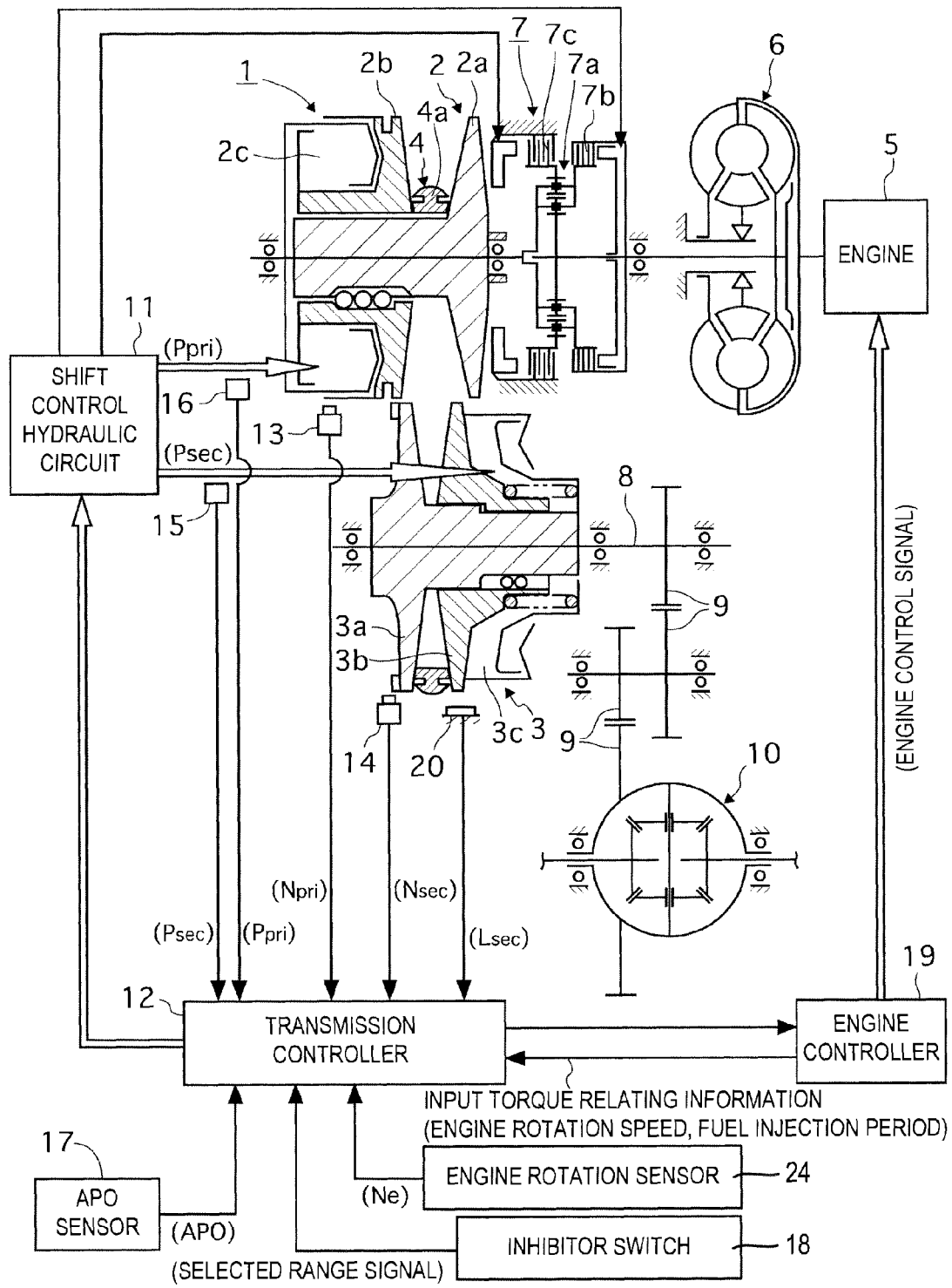
FIG. 1 is a system diagram of a power train of a vehicle equipped with a V-belt continuously variable transmission provided with a control apparatus of a driving force in case of belt slipping according to the first embodiment of the present invention, shown together with a control system thereof.

FIG. 1 schematically shows a power train of a vehicle equipped with a V-belt continuously variable transmission 1 provided with a control apparatus of a driving force in case of belt slipping according to the first embodiment of the present invention together with a control system thereof.

The V-belt continuously variable transmission 1 is provided with a primary pulley 2 and a secondary pulley 3 disposed such that pulley V grooves of both the pulleys are aligned within a plane perpendicular to axes of the pulleys and is configured by wrapping an endless V-belt 4 around the V grooves of the pulleys 2 and 3.

An engine 5 serving as a power source is disposed coaxially with the primary pulley 2 and a lockup torque converter 6 and a forward/reverse-switching mechanism 7 are interposed between the engine 5 and the primary pulley 2 from the side of the engine 5 in order.

The forward/reverse-switching mechanism 7 includes a double pinion planetary gear mechanism 7a as a main constituent element and its input element is configured by connecting a sun gear of the mechanism 7a to the engine 5 via the torque converter 6 while its output element is configured by connecting a carrier of the mechanism 7a to the primary pulley 2.

The forward/reverse-switching mechanism 7 is further provided with a forward clutch 7b directly connecting the sun gear and the carrier of the double pinion planetary gear mechanism 7a to each other and a reverse brake 7c fixing a ring gear.

Therefore, when the forward/reverse-switching mechanism 7 releases both the forward clutch 7b and the reverse brake 7c, it becomes a neutral state where input rotation from the engine 5 via the torque converter 6 is not transmitted to the primary pulley 2, when the forward/reverse-switching mechanism 7 performs engagement of the forward clutch 7b in this state, it can transmit input rotation from the engine 5 via the torque converter 6 to the primary pulley 2 as forward rotation as it is, and when the forward/reverse-switching mechanism 7 performs engagement of the reverse brake 7c, it can transmit input rotation from the engine 5 via the torque converter 6 to the primary pulley 2 as reverse rotation under reverse speed reduction.

Rotation to the primary pulley 2 is transmitted to the secondary pulley 3 via the V-belt 4, and rotation of the secondary pulley 3 then reaches left and right driving wheels (not shown) via an output shaft 8 coupled to the secondary pulley 3, a final reduction gear train 9, and a differential gear unit 10 to be supplied for vehicle running.

In order to make a rotation transmission ratio (speed ratio) between the primary pulley 2 and the secondary pulley 3 variable during the above-mentioned power transmission, ones of opposite sheaves forming V grooves of the primary pulley 2 and the secondary pulley 3 are formed as fixed sheaves 2a and 3a, while the other sheaves 2b and 3b are formed as movable sheaves which are displaceable in axial directions.

These movable sheaves 2b and 3b are respectively thrusted toward the fixed sheaves 2a and 3a by supplying a primary pulley pressure Ppri and a secondary pulley pressure Psec which are generated from a line pressure controlled as described in detail later serving as an original pressure to a primary pulley chamber 2c and a secondary pulley chamber 3c, respectively.

Thereby, the above-mentioned power transmission is made possible between the primary pulley 2 and the secondary pulley 3 by sandwiching the V-belt 4 between the opposite sheaves 2a and 2b and between the opposite sheaves 3a and 3b in a clamping manner.

Figure 2:
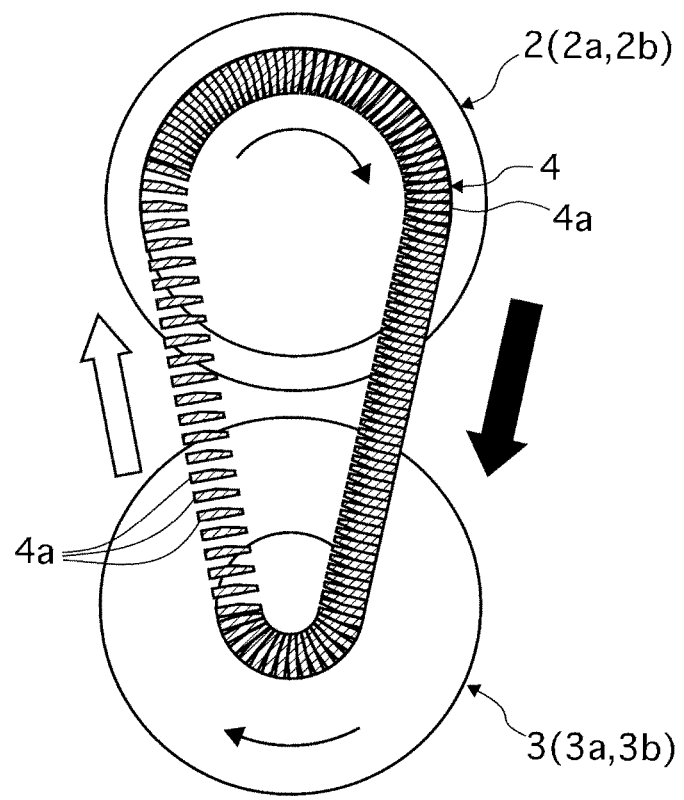
FIG. 2 is a detailed front view of a V-belt wrapping power-transmitting portion of the V-belt continuously variable transmission shown in FIG. 1 where the highest speed ratio is selected.

The V-belt 4 conducting the power transmission is configured by connecting many V-shaped elements 4a as shown in FIG. 1 in a belt shape using an endless band (not shown) as shown in FIG. 2, and the V-shaped elements 4a are sandwiched between the opposite sheaves 2a and 2b and opposite sheaves 3a and 3b in a clamping manner, as shown in FIG. 1, so that power transmission is performed between the primary pulley 2 and the secondary pulley 3.

FIG. 2 shows a highest speed ratio selected state where the contact radius of the V-belt 4 to the primary pulley 2 has been made maximum and the contact radius of the V-belt 4 to the secondary pulley 3 has been made minimum.

<Shift Operation>

In performing shift, a target speed ratio can be realized by changing the V groove widths of both the pulleys 2 and 3 utilizing a differential pressure between the secondary pulley pressure Psec generated in conformity with the target speed ratio utilizing the line pressure controlled as described later as the original pressure and the primary pulley pressure Ppri obtained by utilizing the line pressure as it is to continuously change the contact radii of the V-belt 4 to these pulleys 2 and 3.

The primary pulley pressure Ppri and the secondary pulley pressure Psec together with engagement hydraulic pressures of the forward clutch 7b to be engaged at a forward running range and the reverse brake 7c to be engaged at a reverse running range are controlled by a shift control hydraulic circuit 11.

The shift control hydraulic circuit 11 is configured to perform the control in response to a signal from a transmission controller 12.

Therefore, the transmission controller 12 is inputted with a signal from a primary pulley rotation sensor 13 which detects a primary pulley rotation speed Npri, a signal from a secondary pulley rotation sensor 14 which detects a secondary pulley rotation speed Nsec, a signal from a secondary pulley pressure sensor 15 which detects a secondary pulley pressure Psec, a signal from a primary pulley pressure sensor 16 which detects a primary pulley pressure Ppri, a signal from an accelerator pedal opening sensor (APO sensor) 17 which detects an accelerator pedal depressing amount APO, a selected range signal from an inhibitor switch 18, a signal (an engine rotation speed, a fuel injection period, or the like) regarding a transmission input torque from an engine controller 19 which conducts control of the engine 5, a signal from a movable sheave position sensor 20 which detects a stroke Lsec of the secondary pulley movable sheave 3b, and a signal from an engine rotation sensor 24 which detects an engine rotation speed Ne.

The movable sheave position sensor 20 is a magnetic non-contact type sensor which detects a stroke of the movable sheave 3b magnetically.

Figure 4:
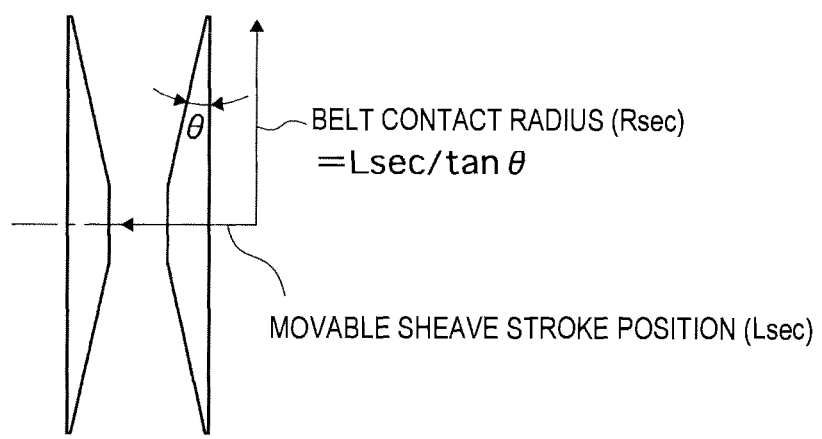
FIG. 4 is an explanatory diagram showing a relationship between a stroke position of a movable sheave making a V-groove width of a pulley variable and a belt contact radius of a V-belt.

When a conical face inclination angle of the movable sheave 3b is represented as θ, a relational expression of Rsec=Lsec/tan θ is established between the movable sheave stroke position Lsec detected by the movable sheave position sensor 20 and a secondary pulley contact radius Rsec of the V-belt 4, as shown in FIG. 4, so that the secondary pulley contact radius Rsec of the V-belt 4 can be calculated from the movable sheave stroke position Lsec using the relational expression.

When the secondary pulley contact radius Rsec of the V-belt 4 is determined, a contact radius Rpri of the primary pulley 2 is determined unambiguously. The ratio between both the radii (Rsec/Rpri) is a belt contact radius ratio i.

In the present embodiment, the belt contact radius ratio i is obtained in the above-mentioned manner based upon the movable sheave stroke position Lsec detected by the movable sheave position sensor 20.

A belt slip ratio SLip of the V-belt 4 to the primary pulley 2 and the secondary pulley 3 indicates a discrepancy state between the pulley rotation ratio λ (=Npri/Nsec) which is a ratio of the primary pulley rotation speed Npri to the secondary pulley rotation speed Nsec and the belt contact radius ratio i (=Rsec/Rpri) (a difference or a ratio between the both), and it is here obtained according to the following equation.

$$SLip=\{(\lambda-i)/i\}\times 100\%$$

Figure 3:
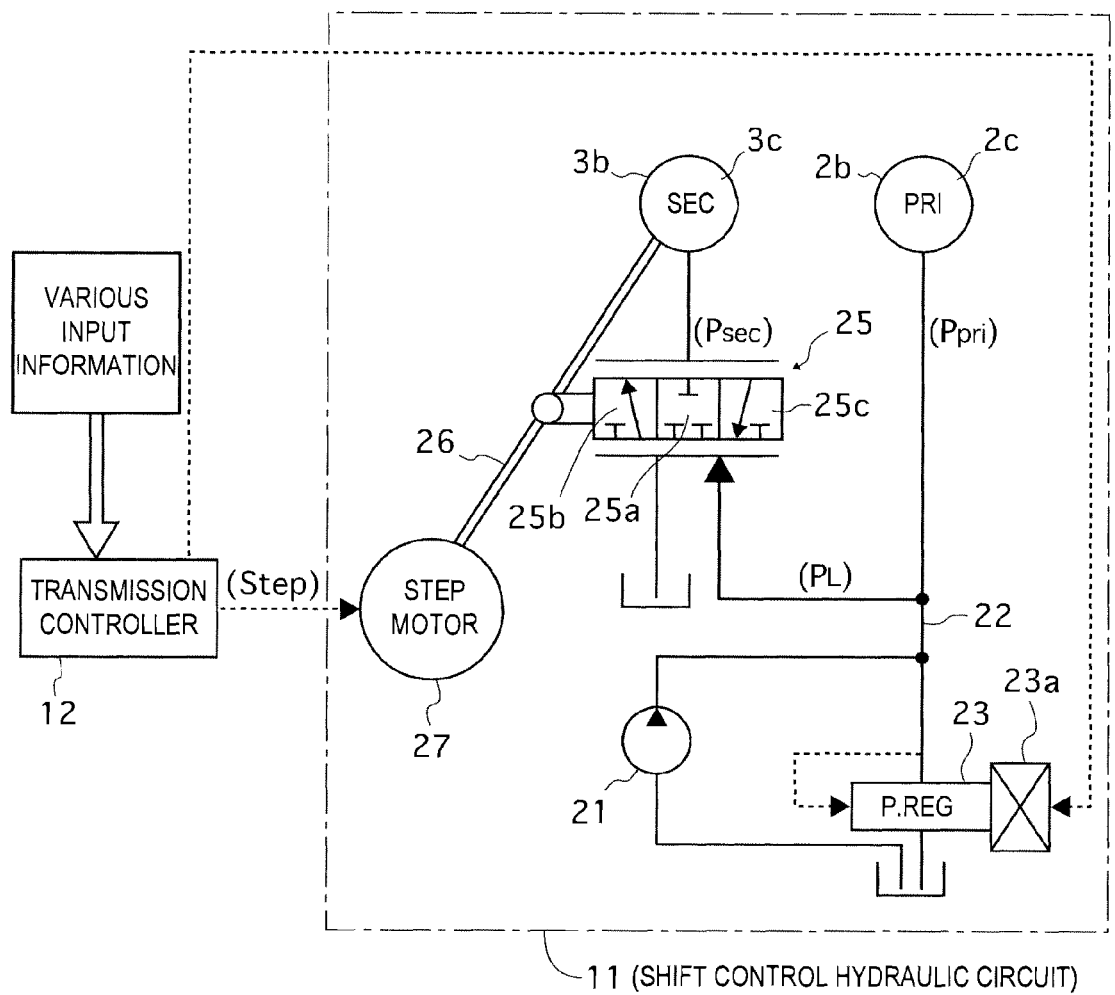
FIG. 3 is a schematic system diagram showing details of a shift control system shown in FIG. 1.

The shift control hydraulic circuit 11 and the transmission controller 12 are configured as shown in FIG. 3, and the shift control hydraulic circuit 11 will be first explained below.

The shift control hydraulic circuit 11 is provided with an oil pump 21 driven by the engine 5, and a predetermined line pressure $P_L$ is pressure-adjusted by a pressure regulator valve 23 utilizing hydraulic oil supplied to an oil passage 22 from the oil pump 21.

The line pressure $P_L$ in the oil passage 22 is supplied to the primary pulley chamber 2c as the primary pulley pressure Ppri as it is, while it is supplied to the secondary pulley chamber 3c as the secondary pulley pressure Psec after being pressure-adjusted by a shift control valve 25.

The pressure regulator valve 23 controls the line pressure $P_L$ to be equal to or more than a pressure corresponding to a transmission input torque according to driving duty to a solenoid 23a.

The shift control valve 25 takes a neutral position 25a, a pressure-increasing position 25b, and a pressure-decreasing position 25c, where, for performing switching between these valve positions, the shift control valve 25 is coupled to an intermediate portion of a shift link 26 and a step motor 27 serving as a shift actuator is coupled to one end of the shift link 26, while the movable sheave 3b of the secondary pulley is coupled to the other end thereof.

The step motor 27 is set to an operation position advanced from a reference position by number of steps Step corresponding to the target speed ratio, and the shift link 26 is swung about a coupling position with the movable sheave 3b serving as a fulcrum by operation of the step motor 27, so that the shift control valve 25 is moved from the neutral position 25a to the pressure-increasing position 25b or the pressure-decreasing position 25c.

The secondary pulley pressure Psec is held at the neutral position 25a of the shift control valve 25, the secondary pulley pressure Psec is pressure-increased using the line pressure $P_L$ which is the original pressure at the pressure-increasing position 25b of the shift control valve 25, and the secondary pulley pressure Psec is pressure-decreased by the drain at the pressure-decreasing position 25c of the shift control valve 25.

When the differential pressure between the secondary pulley pressure Psec and the primary pulley pressure Ppri is changed according to the above-mentioned pressure-increase or pressure-decrease of the secondary pulley pressure Psec, the V-belt continuously variable transmission 1 is shifted down toward a low speed ratio when the secondary pulley pressure Psec increases, while the V-belt continuously variable transmission 1 is shifted up toward a high speed ratio when the secondary pulley pressure Psec decreases, so that the V-belt continuously variable transmission 1 can be shifted toward the target speed ratio.

Progression of the shift is fed back to a corresponding end of the shift link 26 via the movable sheave 3b of the secondary pulley 3, and the shift link 26 is swung about the coupling position with the step motor 27 as a fulcrum in a direction of returning the shift control valve 25 from the pressure-increasing position 25b or the pressure-decreasing position 25c to the neutral position 25a.

Thereby, when the target speed ratio is achieved, the shift control valve 25 is returned to the neutral position 25a, so that the V-belt continuously variable transmission 1 can be held in the target speed ratio by holding the second pulley pressure Psec.

A solenoid-driving duty of the pressure regulator valve 23 and a shift command to the step motor 27 (the number of steps Step) as well as control about whether or not engagement hydraulic pressure is supplied to the forward clutch 7b and the reverse brake 7c shown in FIG. 1 are determined by the transmission controller 12.

In the duty control of the pressure regulator valve 23, the transmission controller 12 determines the driving duty of the solenoid 23a of the pressure regulator valve 23 from a transmission input torque Ti obtained based upon input toque relating information (the engine rotation speed, the fuel injecting period, or the like) from the engine controller 19 (see FIG. 1) such that the line pressure $P_L$ coincides with the target primary pulley pressure (a target V-belt clamping force of the primary pulley 2 and the secondary pulley 3) required for allowing transmission of the transmission input torque Ti.

In the control about whether or not engagement hydraulic pressure is supplied to the forward clutch 7b and the reverse brake 7c shown in FIG. 1, the transmission controller 12 performs the control in response to a selected range signal from the inhibitor switch 18 in the following manner.

When the V-belt continuously variable transmission 1 is in a non-running range such as a P (parking) range or an N (neutral) range, engagement hydraulic pressure is not supplied to the forward clutch 7b and the reverse brake 7c, and the V-belt continuously variable transmission 1 is put in a neutral state where power transmission is not performed by disengagement of the forward clutch 7b and the reverse brake 7c.

When the V-belt continuously variable transmission 1 is in a forward running range such as a D (drive) range, engagement hydraulic pressure is supplied only to the forward clutch 7b, so that the V-belt continuously variable transmission 1 is put into a forward rotation transmission state by the engagement of the forward clutch 7b.

When the V-belt continuously variable transmission 1 is in a reverse running range such as an R (reverse) range, engagement hydraulic pressure is supplied only to the reverse brake 7c, so that the V-belt continuously variable transmission 1 is put into a reverse rotation transmission state by the engagement of the reverse brake 7c.

When the shift command (the number of steps Step) to the step motor 27 is determined, the transmission controller 12 obtains a target speed ratio from a vehicle speed VSP obtained from the secondary pulley rotation speed Nsec and the accelerator pedal opening APO based upon a shift map and it determines the number of steps Step corresponding to the target speed ratio as the shift command, as described later.

The step motor 27 shown in FIG. 3 performs shift of the V-belt continuously variable transmission 1 in response to the shift command according to the shift operation such that the pulley rotation ratio λ coincides with the target speed ratio.

<Belt Slip Control>

It is necessary to perform a belt slip control via the engine rotation speed control and the secondary pulley pressure (Psec) control during power transmission (during power running) of the V-belt continuously variable transmission 1 such that the belt slip ratio SLip of the V-belt 4 to the primary pulley 2 and the secondary pulley 3 reaches an optimal target belt slip ratio from the viewpoint of durability of the V-belt 4, a power transmission efficiency or the like.

Figure 5:
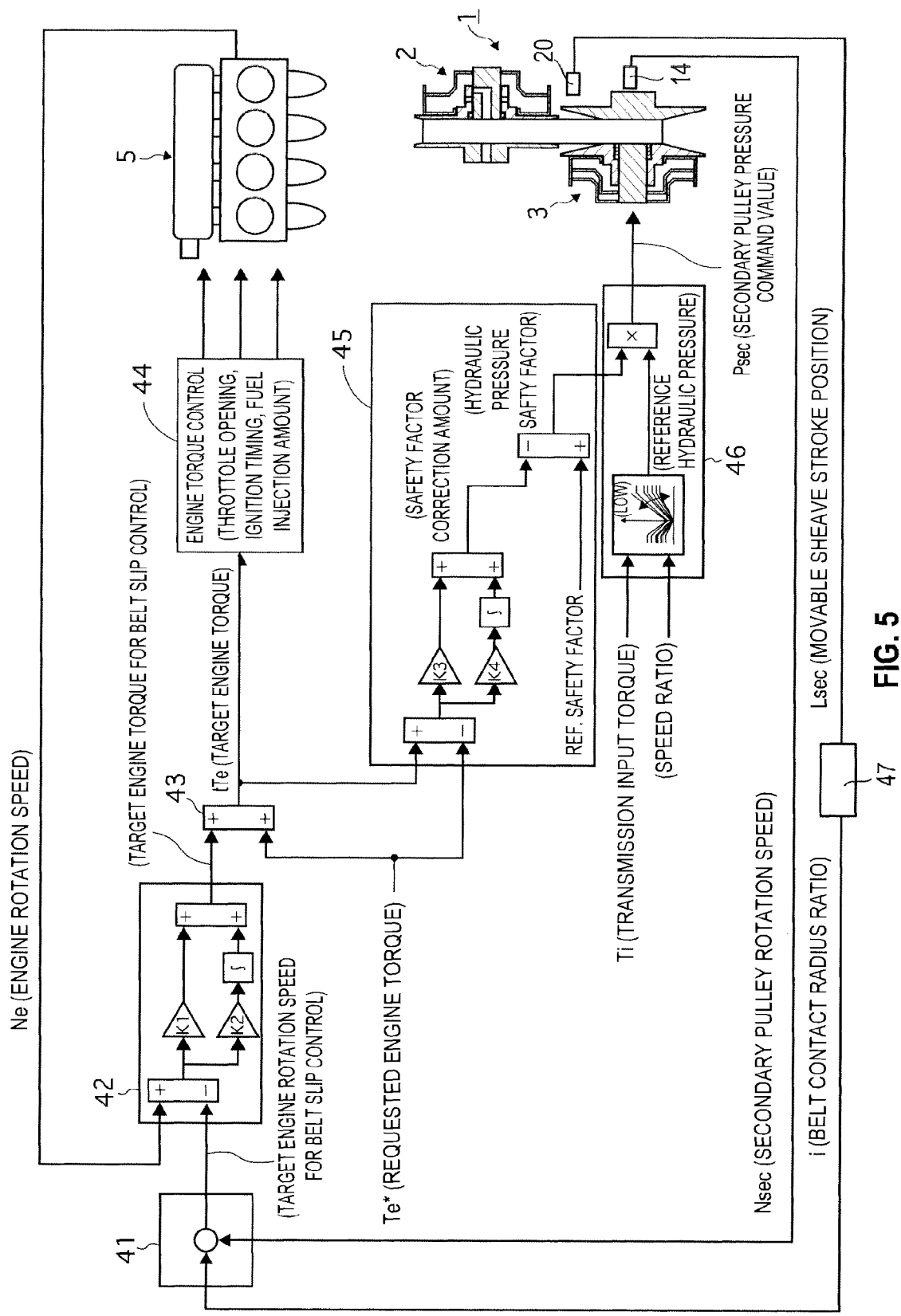
FIG. 5 is a block diagram of individual functions regarding belt-slip control of the V-belt continuously variable transmission performed by a transmission controller and an engine controller in FIGS. 1 and 3.

The former engine rotation speed control is performed based upon information obtained by the engine controller 19 shown in FIG. 1 through communication with the transmission controller 12, while the latter secondary pulley pressure (Psec) control is performed based upon information obtained by the transmission controller 12 and the shift control hydraulic circuit 11 shown in FIG. 1 through communication with the engine controller 19, and these controls are collectively explained briefly with reference to FIG. 5.

At block 41, a target engine rotation speed for the belt slip control required to cause the belt slip ratio SLip to coincide with the target belt slip ratio is obtained from the belt contact radius ratio i and the secondary pulley rotation speed Nsec. The belt contact radius ratio i is calculated at block 47 based upon the movable sheave stroke position Lsec detected by the movable sheave position sensor 20.

At block 42, a target engine torque for the belt slip control required to cause the engine rotation speed Ne to coincide with the target engine rotation speed for the belt slip control is calculated in a feedback manner according to PI control.

That is, at the block 42, a torque amount obtained by multiplying an engine rotation deviation between the target engine rotation speed for the belt slip control from the block 41 and the engine rotation speed Ne by a constant K1 and a torque amount obtained by integrating a value obtained by multiplying the same engine rotation deviation by a constant K2 are summed (PI control), and the summed value of both the torque amounts is defined as a target engine torque for the belt slip control.

At block 43, a final target engine torque tTe is obtained by adding the target engine torque for the belt slip control from the block 42 to a required engine torque Te* required by a driver.

At block 44, torque control is performed such that an engine torque Te reaches the target engine torque tTe. In the engine torque control, the engine 5 is controlled according to an opening control of an electronic control throttle valve (not shown), ignition timing control, and/or fuel injection amount control such that the engine torque Te reaches the target engine torque tTe.

At block 45, a hydraulic pressure safety factor of the secondary pulley pressure Psec required for the V-belt 4 to cause such slip that its slip ratio Slip coincides with the target belt slip ratio is obtained during the above-mentioned engine torque control.

Therefore, a torque deviation between the final target engine torque tTe and the requested engine torque Te* requested by the driver, namely, the same value as the target engine torque for the belt slip control from the block 42 is first obtained.

Next, a safety factor correction amount corresponding to a proportional control obtained by multiplying the above-mentioned torque deviation (tTe−Te*) by a constant K3 and a safety factor correction amount corresponding to an integration control obtained by integrating a value obtained by multiplying the same torque deviation (tTe−Te*) by a constant K4 are summed (PI control), and the summed value of both the safety factor correction amounts is defined as a hydraulic pressure safety factor correction amount of the secondary pulley pressure Psec required to cause the slip ratio SLip of the V-belt 4 to coincide with the target belt slip ratio.

Thereafter, a hydraulic pressure safety factor of the secondary pulley pressure Psec required to cause the belt slip ratio SLip to coincide with the target belt slip ratio is obtained by subtracting the above-mentioned hydraulic pressure safety factor correction amount from a reference safety factor of the secondary pulley pressure Psec which is defined according to the transmission input torque Ti so that the transmission input torque Ti can be transmitted reliably.

At block 46, a command value Psec* of the secondary pulley pressure Psec required to cause the belt slip ratio SLip to coincide with the target belt slip ratio is obtained.

That is, a reference hydraulic pressure of the secondary pulley pressure Psec which can transmit the transmission input torque Ti reliably under the current speed ratio (the belt contact radius ratio) i is first retrieved based upon a scheduled map from the transmission input torque Ti and the speed ratio.

Next, a command value Psec* of the secondary pulley pressure Psec required to cause the belt slip ratio SLip to coincide with the target belt slip ratio is obtained by multiplying the reference hydraulic pressure of the secondary pulley pressure Psec by the hydraulic pressure safety factor from the block 45, and the command value Psec* is utilized for the above-mentioned control of the V-belt continuously variable transmission 1 performed by the transmission controller 12 and the shift control hydraulic circuit 11.

In FIG. 5, slip control is performed such that the belt slip ratio SLip of the V-belt 4 to the primary pulley 2 and the secondary pulley 3 reaches the optimal target belt slip ratio during power transmission (during power running) of the V-belt continuously variable transmission 1 by the above-mentioned engine rotation speed (engine torque) control and secondary pulley pressure (Psec) control in view of the durability of the V-belt 4, the power transmission efficiency or the like.

<Control of Driving Force in Case of Belt Slipping>

Now, as described above, in the V-belt continuously variable transmission which performs shift control such that the pulley rotation ratio λ reaches a value corresponding to the target speed ratio (the target input rotation speed), when the belt slip control as described above is performed actively, the following problem occurs.

That is, if the relationship between the pulley rotation ratio λ and the torque amplifying ratio is fixed during the above-mentioned shift control, the pulley rotation ratio λ can be regarded as a physical amount equivalent to the torque amplifying ratio, so that the shift control serves its purpose.

However, when the slip control is performed such that the belt slip ratio SLip becomes proper, the pulley rotation ratio λ is caused to become the value corresponding to the target speed ratio by the shift control, but the relationship between the pulley rotation ratio λ and the torque amplifying ratio is changed (offset) by an amount corresponding to belt slip.

In this case, even if shift control is performed such that the pulley rotation ratio coincides with the value corresponding to the target speed ratio under the same transmission input torque, the transmission output torque (the driving force of the vehicle) is varied by an amount corresponding to the change (offset) of the relationship between the pulley rotation ratio λ and the torque amplifying ratio, which causes such a problem that the driving force is changed by the control of belt slip.

Figure 12:
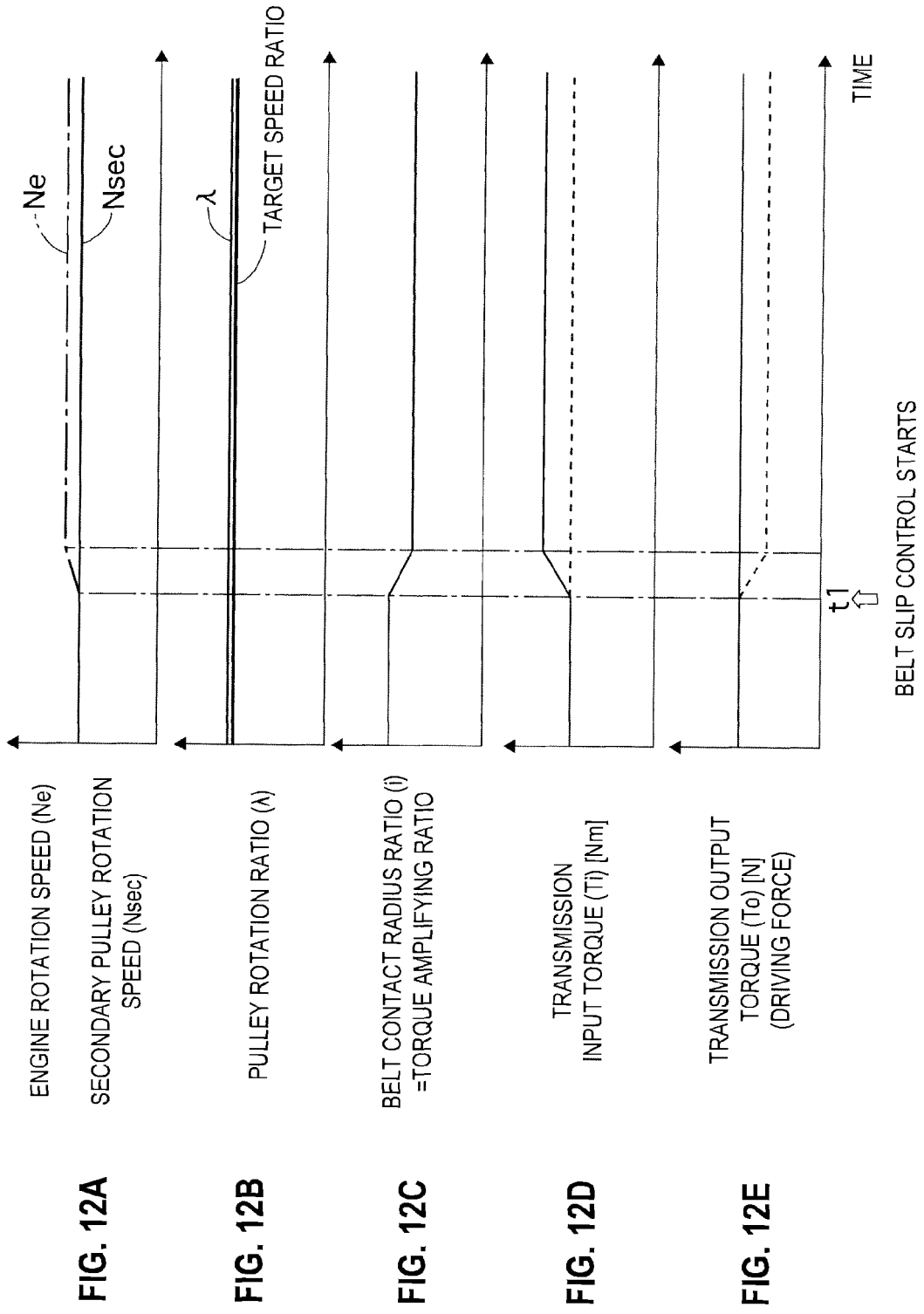
FIGS. 12A to 12E are operation time charts of a control apparatus of a driving force in case of belt slipping according to the first embodiment and the second embodiment of the present invention.

As shown in FIGS. 12A to 12E, as a result of starting the belt slip control at a time t1, such a case that the engine rotation speed Ne (the primary pulley rotation speed Npri) rises to be higher than the secondary pulley rotation speed Nsec due to belt slip as shown by a dashed-dotted line shown in FIG. 12A will be explained below.

Though the pulley rotation λ is caused to coincide with the value corresponding to the target speed ratio by the above-mentioned shift control, the relationship between the pulley rotation λ and the torque amplifying ratio is changed (offset) by an amount corresponding to belt slip.

In this case, when the transmission input torque Ti is kept in the same value as shown by a broken line in FIG. 12D even after the belt slip control starting time t1, even if shift control is performed such that the pulley rotation λ reaches the value corresponding to the target speed ratio, the belt contact radius ratio (the torque amplifying ratio) i is made small by an amount corresponding to the change (offset) of the relationship between the pulley rotation λ and the torque amplifying ratio after the belt slip control starting time t1, as shown in FIG. 12C.

Such lowering of the belt contact radius ratio (torque amplifying ratio) i reduces a transmission output torque (a driving force of the vehicle) To after the belt slip control starting time t1 as shown by a broken line in FIG. 12E.

Such reduction of the transmission output torque (the driving force of the vehicle) To during the belt slip control not only accompanies deterioration of the vehicle running performance but also causes a problem such as an uncomfortable driving feeling.

When the engine rotation speed Ne (the primary pulley rotation speed Npri) rises at a belt slip control starting time t1 like the dashed-dotted line shown in FIG. 12A even though the driver does not conduct any accelerator pedal operation, such a problem arises that the rising of rotation gives the driver an uncomfortable feeling, which results in further deterioration of driving feeling.

Figure 6:
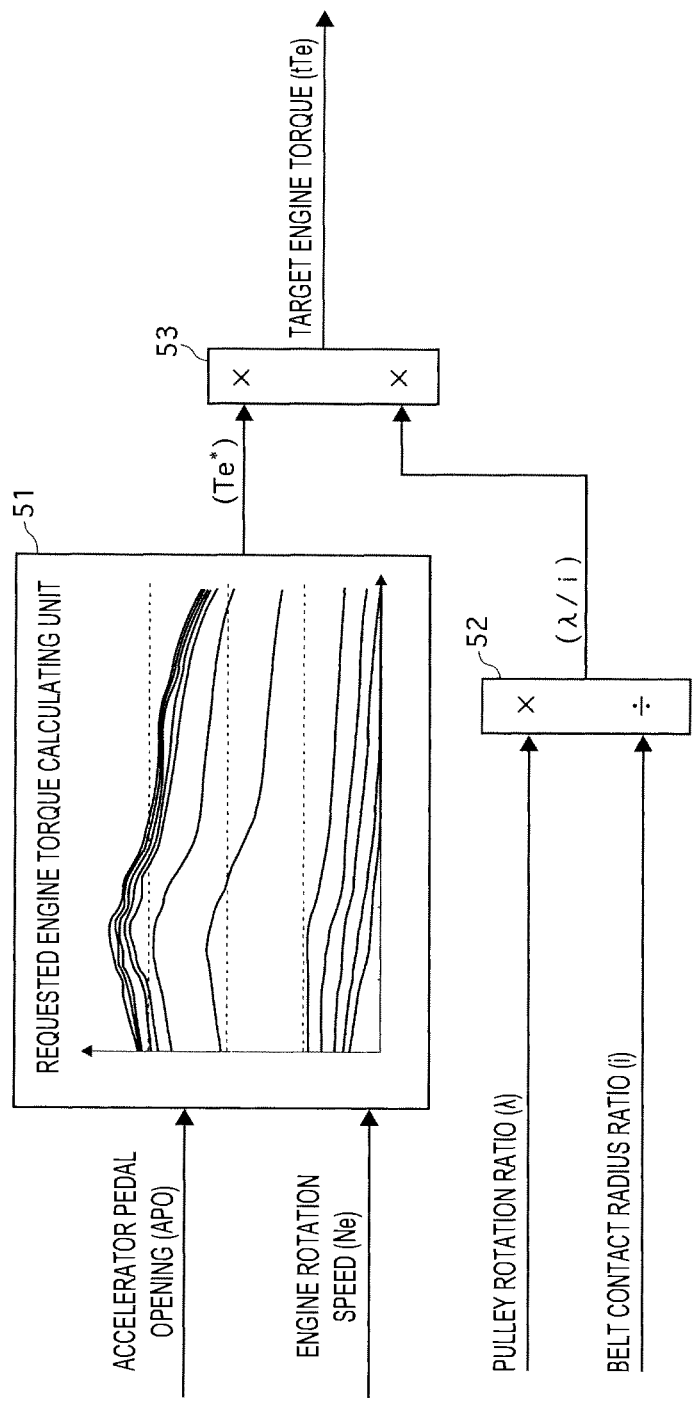
FIG. 6 is a block diagram of individual functions for a target engine torque calculation processing performed by the engine controller shown in FIGS. 1 and 3.
Figure 7:
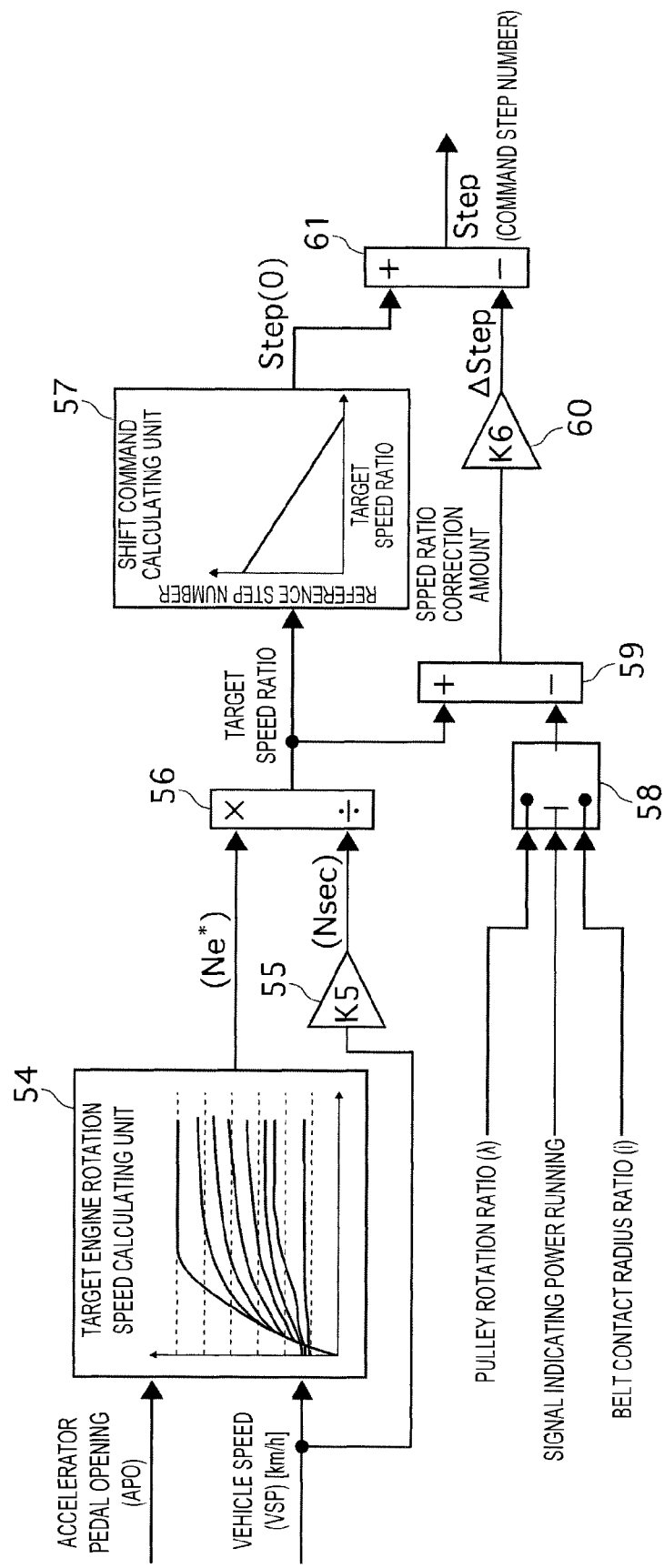
FIG. 7 is a block diagram of individual functions for a step motor position calculation processing performed by the transmission controller shown in FIGS. 1 and 3.

The present embodiment solves the former problem of these problems regarding the lowering of the transmission output torque (the driving force of the vehicle) To by such driving force control via the engine torque control as shown in FIG. 6, and solves the latter problem regarding the rising of the engine rotation speed Ne (the primary pulley rotation speed Npri) by such shift control via the step motor control as shown in FIG. 7.

The engine torque control (the driving force control) shown in FIG. 6 will be first explained.

Figure 8:
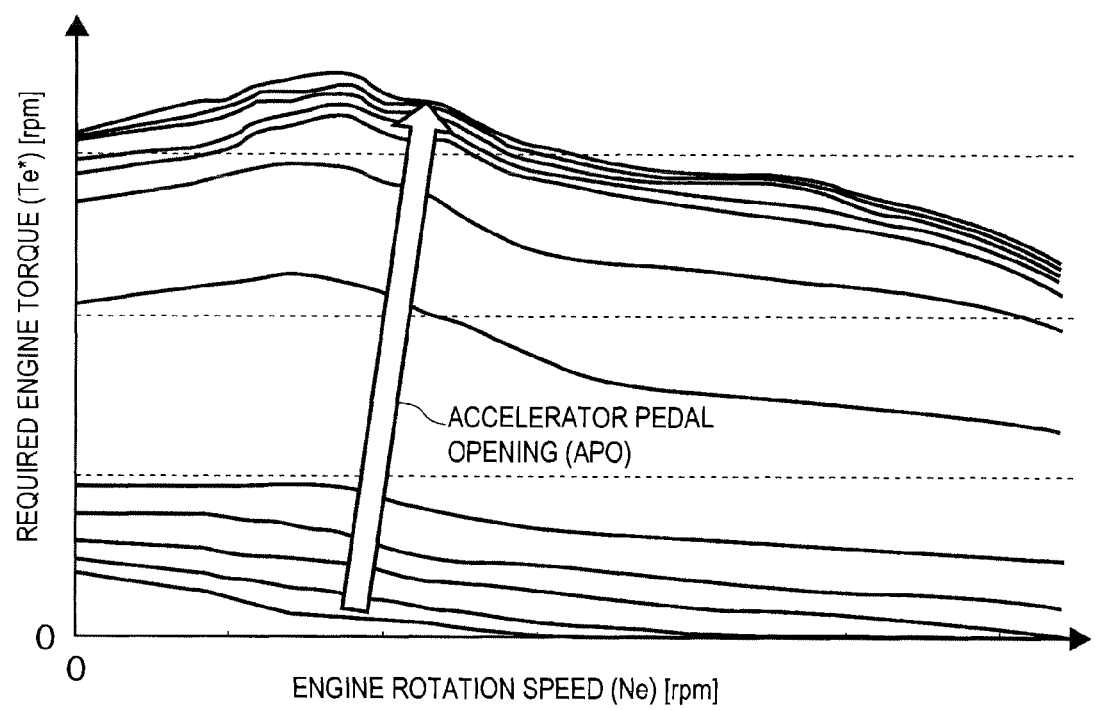
FIG. 8 is an engine performance diagram showing relationship between a rotation speed, an accelerator pedal opening, and a requested torque of an engine in FIG. 1.

A requested engine torque calculating unit 51 obtains the requested engine torque Te* requested by the driver from the engine rotation speed Ne and the accelerator pedal opening APO (engine-requesting load) based upon a performance map of the engine 5 exemplified in FIG. 8 and preliminarily obtained.

In the present embodiment, in order to realize solution of the above-mentioned problem, the requested engine torque Te* is not used for engine control as the target engine torque tTe as it is, but the target engine torque tTe is calculated from the requested engine torque Te*, the pulley rotation ratio λ, and the belt contact radius ratio i in the following manner.

That is, a divider 52 divides the pulley rotation λ by the belt contact radius ratio i to obtain a divided value (λ/i).

Now, the pulley rotation λ is kept at the target speed ratio by the above-mentioned shift control even during the above-mentioned belt slip control, as shown in FIG. 12B, but the belt contact radius ratio i lowers by the amount corresponding to belt slip as shown in FIG. 12C for the above-mentioned reason.

However, the above-mentioned lowering does not occur in the belt contact radius ratio i when the belt slip control is not performed and the belt contact radius ratio i is equal to the pulley rotation ratio λ, so that the divided value (λ/i) is 1.

The above-mentioned lowering occurs in the belt contact radius ratio i during the belt slip control and the belt contact radius ratio i becomes smaller than the pulley rotation ratio λ, so that the divided value (λ/i) become a value larger than 1.

Accordingly, the divided value (λ/i)=1 shows that the belt slip control is in non-execution, while the divided value (λ/i) >1 shows that the belt slip control is in execution.

Since the degree of the lowering of the belt contact radius ratio i corresponds to magnitude of the belt slip ratio SLip, the divided value (λ/i) becomes larger according to increase of the belt slip ratio SLip and it also indicates the magnitude of the belt slip ratio SLip.

A multiplier 53 multiplies the requested engine torque Te* obtained at the calculating unit 51 by the above-mentioned divided value (λ/i) to obtain the target engine torque tTe, so that the target engine torque tTe is utilized for output control of the engine 5 performed by the engine controller 19.

Now, as described above, since the divided value (λ/i) reaches a value larger than 1 according to increase of the belt slip ratio SLip, the target engine torque tTe is increased up to a value corresponding to magnitude of the belt slip ratio SLip after the belt slip control starting time t1 shown in FIGS. 12A to 12E.

Thereby, the transmission input torque Ti into the V-belt continuously variable transmission 1 is increased after the belt slip control starting time t1 shown in FIGS. 12A to 12E as shown by a solid line in FIG. 12D, so that the torque increase amount corresponds to magnitude of the belt slip ratio SLip.

The increase of the transmission input torque Ti can compensate for lowering of the transmission output torque (the driving force of the vehicle) To shown by the broken line and occurring due to belt slip during the belt slip control, so that the transmission output torque To can be kept constant even during the belt slip control as shown by a solid line in FIG. 12E.

From the above, lowering of the transmission output torque To during the belt slip control can be avoided, and the above-mentioned problem about deterioration of the vehicle running performance and deterioration of the driving feeling due to the driving force lowering can be solved.

<Shift control in Case of Belt Slipping>

Next, shift control performed via step motor control shown in FIG. 7 in order to prevent the engine rotation speed Ne (the primary pulley rotation speed Npri) from rising as shown by the dashed-dotted line during the belt slip control after the time t1 shown in FIG. 12A will be explained.

Figure 9:
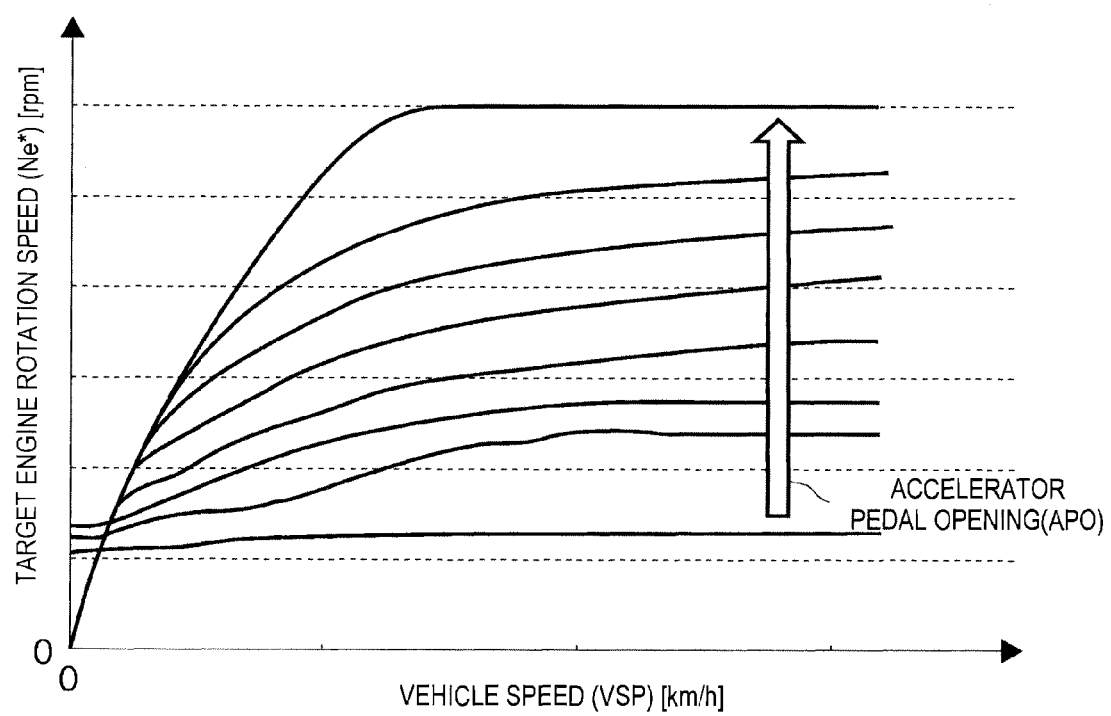
FIG. 9 is a shift diagram showing a shift pattern of the V-belt continuously variable transmission shown in FIG. 1.

A target engine rotation speed calculating unit 54 obtains a target engine rotation speed Ne* for achieving the torque amplifying ratio of the V-belt continuously variable transmission 1 requested by the driver in a current driving state from the accelerator pedal opening APO and the vehicle speed VSP based upon the shift map exemplified in FIG. 9.

A multiplier 55 multiplies the vehicle speed VSP by an output rotation calculation constant K5 to obtain an output rotation speed (the secondary pulley rotation speed) Nsec of the V-belt continuously variable transmission 1.

A divider 56 divides the above-mentioned target engine rotation speed Ne* by the above-mentioned transmission output rotation speed Nsec to calculate the target speed ratio.

A shift command calculating unit 57 calculates a shift command (reference step number Step(0)) to the step motor 27 required for realizing the target speed ratio obtained at the divider 56.

For this calculation, a relationship between the reference step number Step(0) and the speed ratio obtained when the reference step number Step(0) is commanded to the step motor 27 is preliminarily mapped according to experiment or the like and the reference step number Step(0) is obtained from the target speed ratio based upon the map.

In the present embodiment, in order to achieve the above object, the reference step number Step(0) is corrected in the following manner to prepare a command step number Step to the step motor 27 without commanding the reference step number Step(0) to the step motor 27 as it is.

A speed ratio selecting unit 58 is inputted with the pulley rotation ratio λ, a signal indicating that power running is in execution (the belt slip control is in execution), and the belt contact radius ratio i to calculate a speed ratio for preventing engine rotation rising in case of belt slipping in the following manner.

The speed ratio selecting unit 58 checks whether or not the signal indicating that power running is in execution (the belt slip control is in execution) exists.

If the signal indicating that power running is in execution (the belt slip control is in execution) does not exist, the pulley rotation λ expresses an actual speed ratio well, so that the command step number Step to the step motor 27 can be determined according to such feedback control that the pulley rotation λ follows up the target speed ratio in response to a deviation between the pulley rotation ratio λ and the target speed ratio.

Now, if the signal indicating that power running is in execution (the belt slip control is in execution) does not exist, the speed ratio selecting unit 58 inputs the pulley rotation λ into a minus input of a subtracter 59 as it is as the speed ratio for preventing engine rotation rising in case of belt slipping.

At this time, the subtracter 59 subtracts the pulley rotation λ to the minus input from the target speed ratio to a plus input to generate a deviation between both the ratios as a speed ratio correction amount.

A multiplier 60 multiplies the speed ratio correction amount by a motor step number conversion factor K6 to obtain a motor step number correction amount ΔStep required for causing the pulley rotation λ to follow up the target speed ratio.

A subtracter 61 performs correction so as to lower the reference step number Step(0) obtained at the shift command calculating unit 57 by the motor step number correction amount ΔStep to determine a value obtained by the correction as the command step number Step to the step motor 27.

Thus, in a period except for that power running is in execution (the belt slip control is in execution), the step motor 27 responds to the command step number Step determined according to the feedback control corresponding to the deviation between the pulley rotation λ and the target speed ratio to cause the pulley rotation λ to follow up the target speed ratio.

However, if shift for causing the pulley rotation λ to follow up the target speed ratio has been continued in this manner even during the belt slip control, the engine rotation speed Ne (the primary pulley rotation speed Npri) rises due to belt slip as shown by the dashed-dotted line in FIG. 12A despite the situation where the accelerator pedal is not depressed and thus an uncomfortable feeling is given to the driver.

The speed ratio selecting unit 58 can dissipate the uncomfortable feeling in the following manner during existence of the signal indicating that power running is in execution (the belt slip control is in execution).

That is, the speed ratio selecting unit 58 inputs the belt contact radius ratio i into the minus input of the subtracter 59 instead of the pulley rotation ratio λ during the power running (during the belt slip control).

In this case, the subtracter 59 subtracts the belt contact radius ratio i from the target speed ratio to determine a deviation between both the ratios as a speed ratio correction amount.

A multiplier 60 multiplies the speed ratio correction amount by the motor step number conversion factor K6 to obtain the motor step number correction amount ΔStep required for causing the pulley rotation λ to follow up the target speed ratio.

A subtracter 61 performs correction so as to lower the reference step number step (0) by the motor step number correction amount ΔStep to determine a value obtained by the correction as the command step number Step to the step motor 27.

Now, since the belt contact radius ratio i is made small by a slip amount during the belt slip control, as described above in FIG. 12C, the speed ratio correction amount from the subtracter 59 means a speed ratio correction amount for cancelling rotation rising of the engine rotation speed Ne corresponding to the belt slip amount shown by the dashed-dotted line in FIG. 12A.

Such a fact that the reference step number Step (0) is lowered at the subtracter 61 by the motor step number correction amount ΔStep corresponding to the speed ratio correction amount means that shift for directing the pulley rotation λ toward the target speed ratio is performed such that the belt contact radius ratio i becomes smaller (the ratio changes toward High) according to increase of belt slip.

Therefore, the speed ratio of the V-belt continuously variable transmission 1 is made closer to High speed ratio by an amount corresponding to the speed ratio for preventing engine rotation rising due to belt slip during power running (during the belt slip control) than during belt slip non-control, so that rising of the engine rotation speed Ne due to belt slip shown by the dashed-dotted line in FIG. 12A can be avoided.

Accordingly, such an event that the engine rotation speed Ne rises even though the driver does not conduct depression of the accelerator pedal does not occur, so that an uncomfortable feeling due to such an event can be prevented.

<Second Embodiment>

Figure 10:
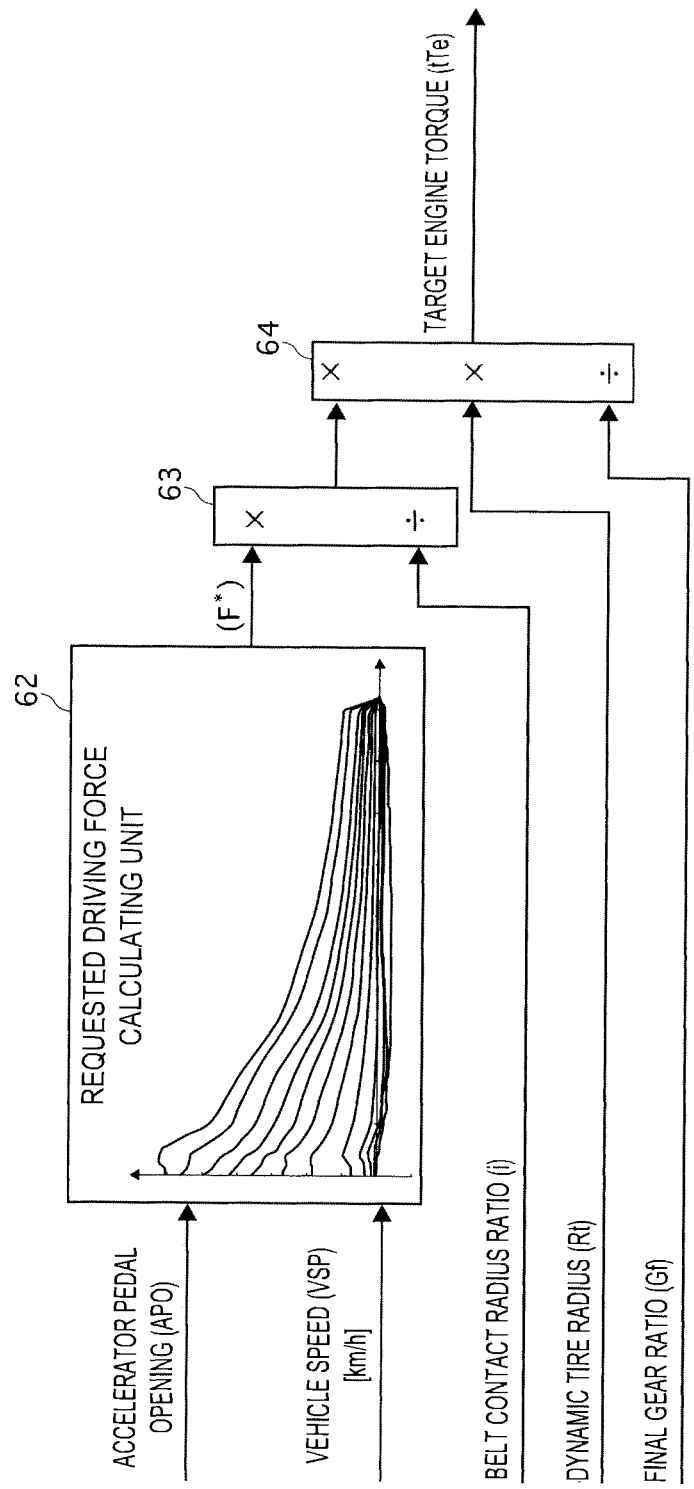
FIG. 10 is a block diagram of individual functions regarding a target engine torque calculation processing similar to that in FIG. 6, showing the second embodiment of the present invention.

FIG. 10 shows the target engine torque calculation processing unit of the driving force control apparatus in case of belt slipping according to the second embodiment of the present invention, where the target engine torque calculation processing unit is used in this embodiment instead of the target engine torque calculation processing unit of the first embodiment shown in FIG. 6 and the remaining configuration of the second embodiment is similar to that of the first embodiment.

Figure 11:
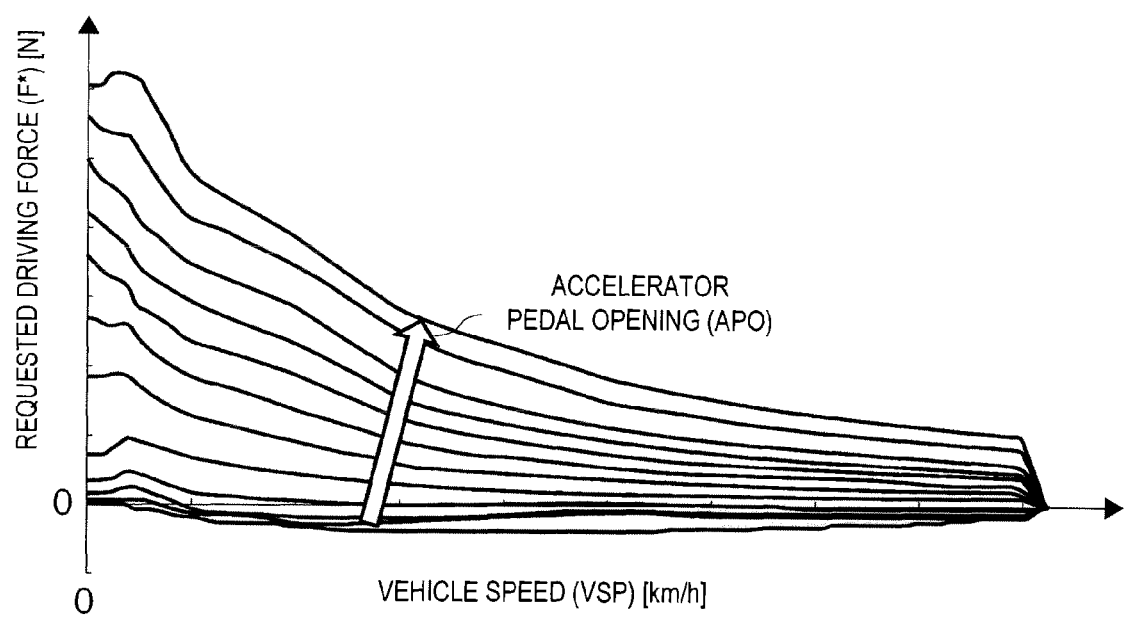
FIG. 11 is a characteristic diagram showing a relationship between a vehicle speed, the accelerator pedal opening, and a requested driving force of a power train in FIG. 1.

A requested driving force calculating unit 62 shown in FIG. 10 obtains a requested driving force F* of the vehicle requested by the driver in a current driving state from the acceleration pedal opening APO and the vehicle speed VSP based upon a driving force map exemplified in FIG. 11.

A divider 63 divides the above-mentioned requested driving force F* by a belt contact radius ratio i, a multiplying and dividing unit 64 multiplies the divided value obtained at the divider 63 by a dynamic tire radius Rt and divides the multiplied value by a final gear ratio Gf which is a total gear ratio of the final reduction gear train 9 and the differential gear unit 10 to obtain the target engine torque tTe required to realize the above-mentioned requested driving force F* and utilize the same for output control of the engine 5 performed by the engine controller 19.

Now, even in the embodiment, since the belt contact radius ratio i is used for calculation of the target engine torque tTe, and since the target engine torque tTe is obtained in this case by dividing the requested driving force F* by the belt contact radius ratio i, when the belt contact radius ratio i lowers during the belt slip control by an amount corresponding to belt slip as shown in FIG. 12C, it functions to increase the target engine torque tTe in response to the belt slip.

Thereby, the transmission input torque Ti into the V-belt continuously variable transmission 1 is increased after the belt slip control starting time t1 as shown by a solid line in FIG. 12D, and the torque increase amount corresponds to magnitude of the belt slip ratio SLip.

Such increase of the transmission input torque Ti can compensate for lowering of the transmission output torque (the driving force of the vehicle) To occurring due to belt slip during the belt slip control and shown by the broken line in FIG. 12E, so that the transmission output toque To can be kept constant even during the belt slip control as shown by the solid line in FIG. 12E.

From the above, lowering of the transmission output torque To during the belt slip control can be avoided, so that the above-mentioned problem about deterioration of vehicle running performance or deterioration of driving feeling due to the lowering of the driving force can be solved.

<Another Embodiment>

In the above-mentioned embodiments, the magnetic non-contact type sensor which magnetically detects the stroke of the movable sheave 3b is used as the movable sheave position sensor 20 as shown in FIG. 1, but such a member as described below can be used instead.

Figure 13:
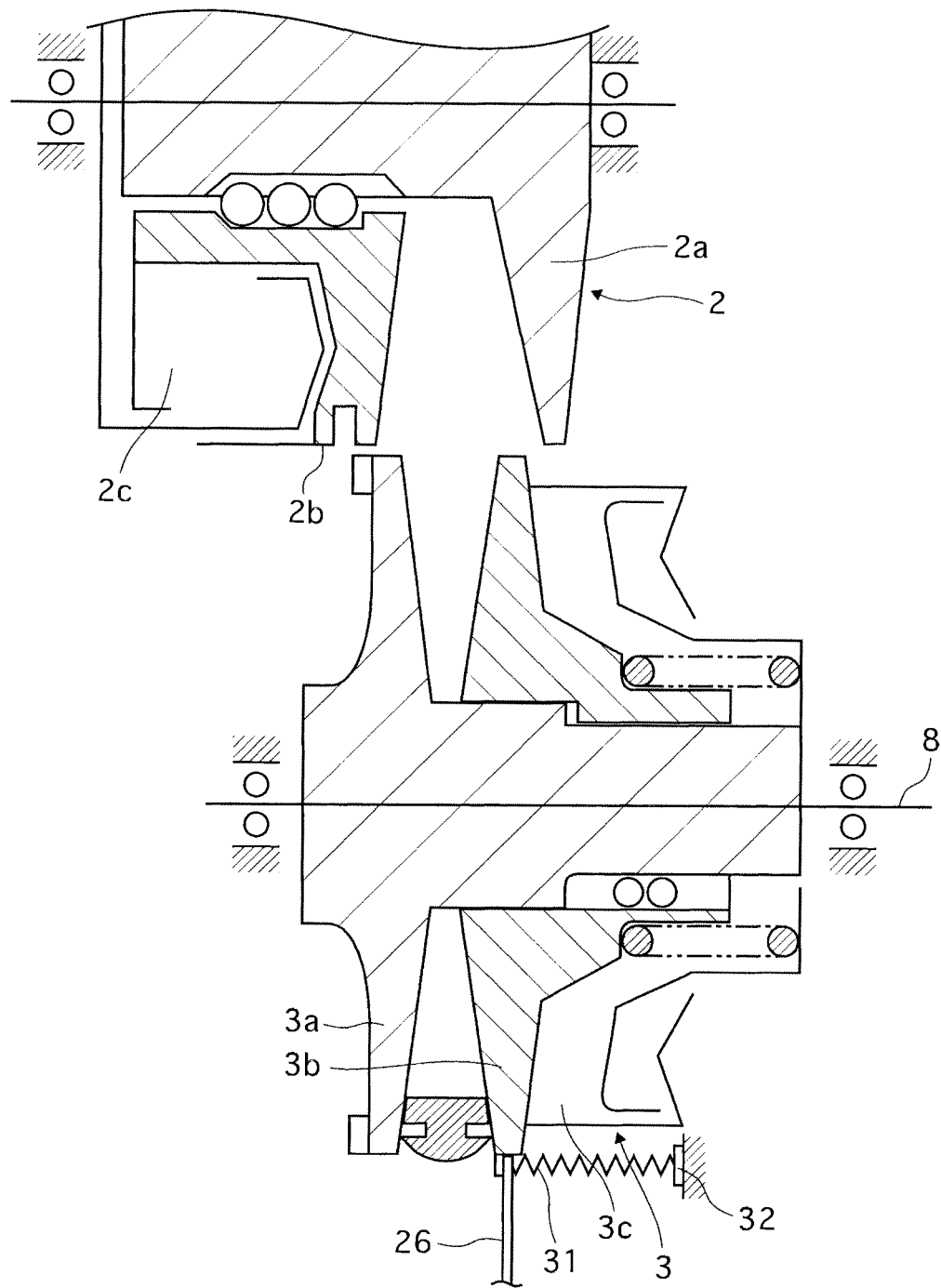
FIG. 13 is an enlarged sectional side view of a V-belt wrapping power-transmitting portion, showing another example of a movable sheave position sensor.

That is, as shown in FIG. 13, a strain gauge 32 is provided between a spring 31 for resiliently supporting the end portion of the shift link 26 (also see FIG. 3) near the movable sheave 3b of the secondary pulley 3 to the movable sheave 3b on the secondary pulley 3 and a transmission case on which the spring is seated and it is used as the movable sheave position sensor.

In this case, since a spring force of the spring 31 is put in a proportional relationship to the stroke position of the movable sheave 3b of the secondary pulley 3 and an output of the strain gauge 32 is determined in response to a spring force of the spring 31, the output (a detection value) of the strain gauge 32 can be used as the stroke position signal of the movable sheave 3b.

This application claims priority based on Japanese Patent Application No. 2009-138913, filed with the Japan Patent Office on Jun. 10, 2009, the entire content of which is incorporated into this specification.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A control apparatus of a driving force in case of belt slipping for a vehicle equipped with a V-belt continuously variable transmission where rotation from a power source can be transmitted via a V-belt wrapped around pulleys, a pulley rotation ratio between the pulleys can be continuously changed toward a value corresponding to a target speed ratio by stroking movable sheaves defining pulley V grooves for wrapping the V-belt relative to fixed sheaves in an axial direction, and a slip state of the V-belt to the pulleys is controlled to a predetermined slip state by a belt slip control, comprising:
   a belt slip control detecting unit adapted to detect that the belt slip control is in execution;
   a belt contact radius ratio calculating unit adapted to calculate a belt contact radius ratio of the V-belt to the pulleys; and
   a power source output torque determining unit adapted to determine a target power source output torque according to the belt contact radius ratio in execution of the belt slip control in response to signals from the belt slip control detecting unit and the belt contact radius ratio calculating unit.

2. The control apparatus according to claim 1, further comprising:
   a movable sheave position sensor adapted to detect a stroke position of one of the movable sheaves, wherein the belt contact radius ratio calculating unit calculates the belt contact radius ratio from the stroke position detected by the movable sheave position sensor.

3. The control apparatus according to claim 1, wherein the belt slip control detecting unit detects that the belt slip control is in execution from a divided value obtained by dividing the pulley rotation ratio by the belt contact radius ratio, and the power source output torque determining unit multiplies a requested power source output toque obtained from a power source requested load and power source rotation speed by the divided value to calculate the target power source output torque.

4. The control apparatus according to claim 1, wherein the power source output torque determining unit further comprises a requested driving force calculating unit adapted to calculate a requested driving force of the vehicle from a power source requested load and transmission output rotation speed, and the power source output torque determining unit calculates the target power source output torque from the requested driving force obtained by the requested driving force calculating unit, a final gear ratio of the vehicle and the belt contact radius ratio.

5. The control apparatus according to claim 1, further comprising:

a shift control unit adapted to perform a shift of the V-belt continuously variable transmission for performing the pulley rotation ratio toward the value corresponding to the target speed ratio such that the belt contact radius ratio becomes smaller according to an increase of a slip ratio of the V-belt to the pulleys.

6. A control method of a driving force in case of belt slipping for a vehicle equipped with a V-belt continuously variable transmission where rotation from a power source can be transmitted via a V-belt wrapped around pulleys, a pulley rotation ratio between the pulleys can be continuously changed toward a value corresponding to a target speed ratio by stroking movable sheaves defining pulley V grooves for wrapping the V-belt relative to fixed sheaves in an axial direction, and a slip state of the V-belt to the pulleys is controlled to a predetermined slip state by a belt slip control, comprising:

detecting that the belt slip control is in execution; using a controller;

calculating a belt contact radius ratio of the V-belt to the pulleys using the controller; and determining a target power source output torque, which is utilized for an output control of the power source, according to the belt contact radius ratio in execution of the belt slip control in response to results of the detecting operation and the calculating operation using the controller.

7. A control apparatus of a driving force in case of belt slipping for a vehicle equipped with a V-belt continuously variable transmission where rotation from a power source can be transmitted via a V-belt wrapped around pulleys, a pulley rotation ratio between the pulleys can be continuously changed toward a value corresponding to a target speed ratio by stroking movable sheaves defining pulley V grooves for wrapping the V-belt relative to fixed sheaves in an axial direction, and a slip state of the V-belt to the pulleys is controlled to a predetermined slip state by a belt slip control, comprising:

belt slip control detecting means adapted to detect that the belt slip control is in execution;

belt contact radius ratio calculating means adapted to calculate a belt contact radius ratio of the V-belt to the pulleys; and power source output torque determining means adapted to determine a target power source output torque according to the belt contact radius ratio in execution of the belt slip control in response to signals from the belt slip control detecting means and the belt contact radius ratio calculating means.

\* \* \* \* \*